United States Patent Office 3,644,617
Patented Feb. 22, 1972

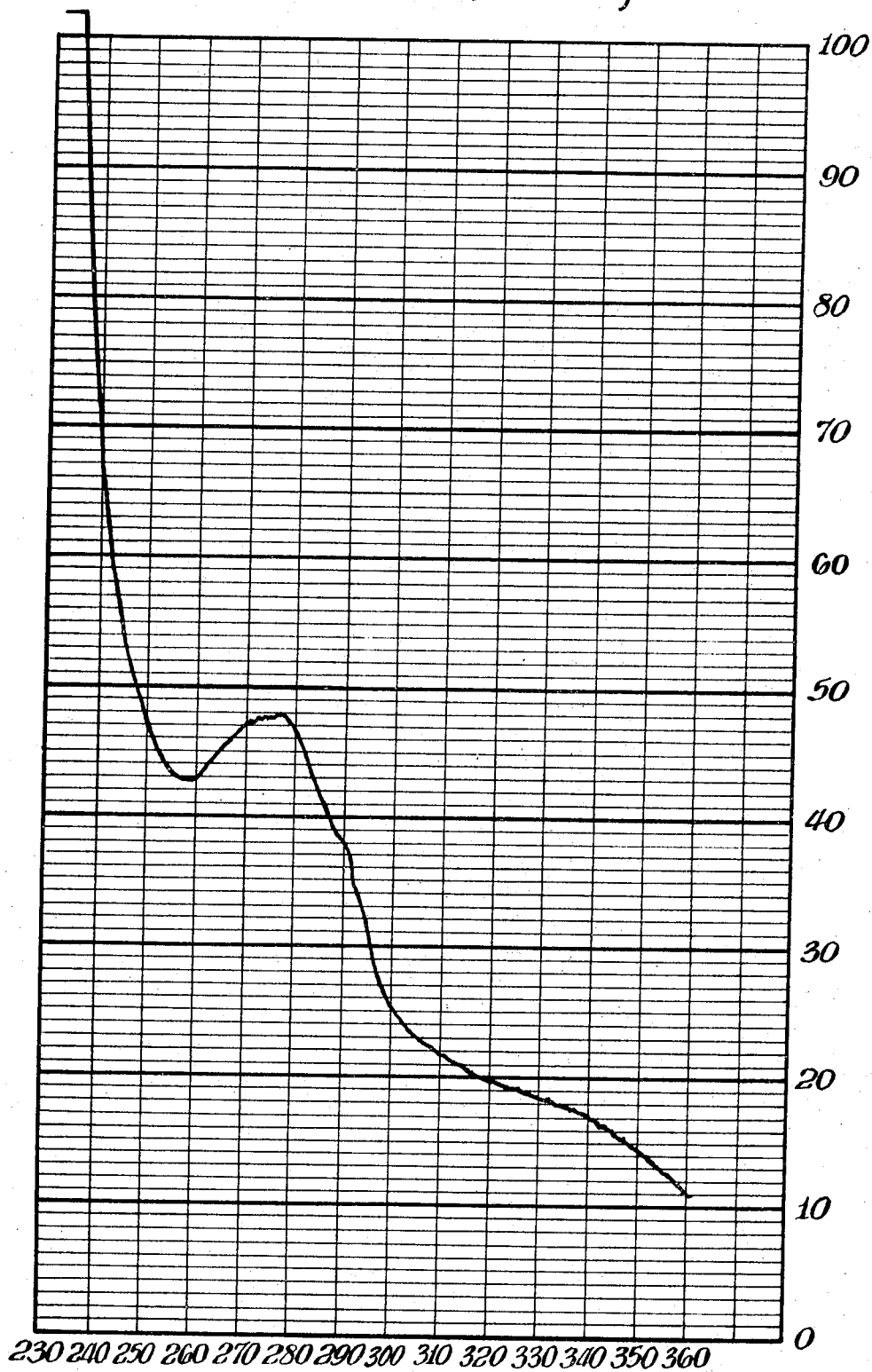
Fig.I.
Ultraviolet Absorption Spectrum of Mitomalcin

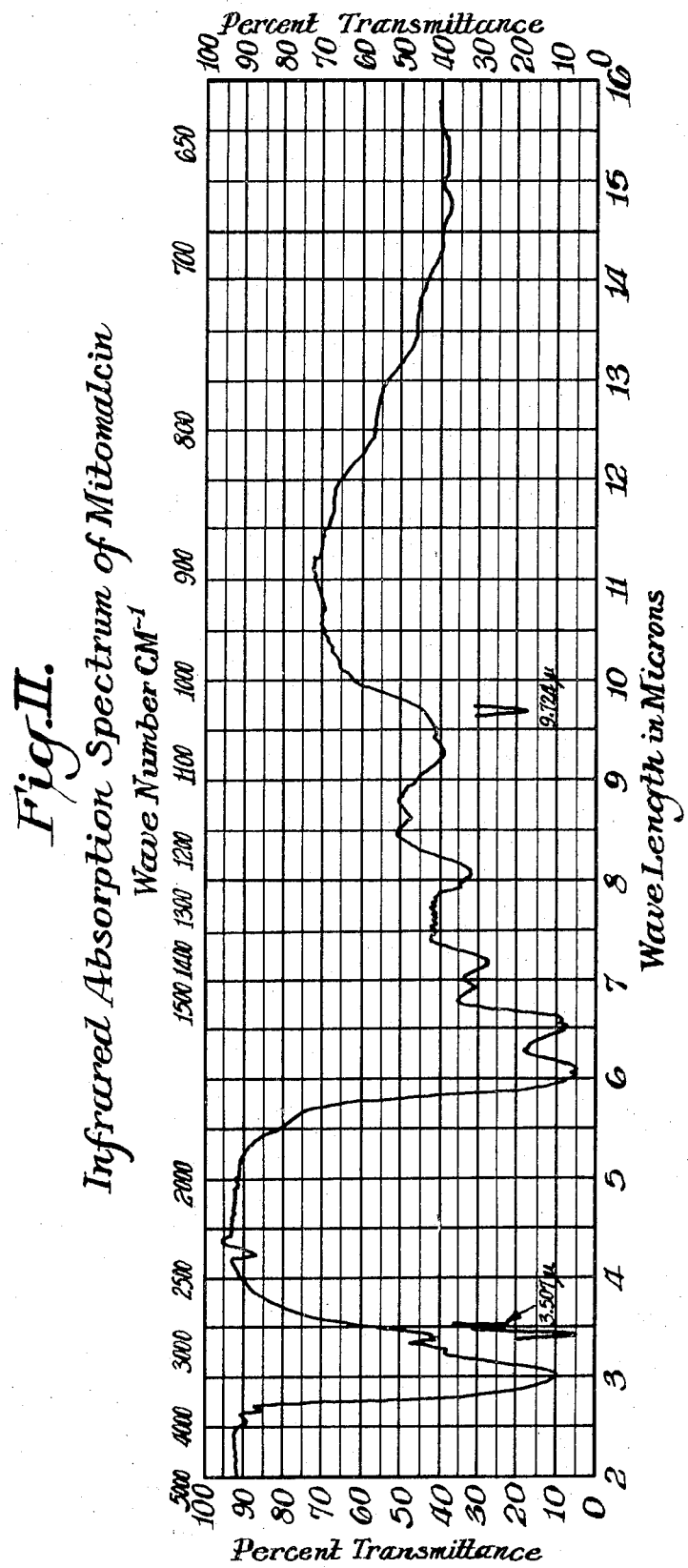

3,644,617
MITOMALCIN AND METHOD FOR ITS PRODUCTION
Michael Axelrod, Hackensack, and William S. Marsh, Wanaque, N.J., Koppaka V. Rao, Cambridge, Mass., and Charles S. Sodano, Maywood, N.J., assignors to Pfizer Inc.
Filed May 9, 1968, Ser. No. 727,932
Int. Cl. A61k 21/00
U.S. Cl. 424—115
2 Claims

ABSTRACT OF THE DISCLOSURE

Mitomalcin, an antibiotic and complexing agent, and its production by *Streptomyces malayensis*, a new species of *Streptomyces*, and variants thereof are described.

BACKGROUND OF THE INVENTION

This invention relates to the new and useful fermentation product called mitomalcin, to its production by fermentation, to methods for its recovery and concentration from crude solutions, such as fermentation broths, and to processes for its purification. The invention includes within its scope this product in dilute forms, as crude concentrates and also the pure form thereof.

This novel product is useful as an antibiotic agent and as complexing agent for polyvalent transition metal ions such as copper, cobalt, nickel, manganese, zinc and cadmium. It is, therefore, useful for removal of polyvalent ions in biological experimentation and in analytical procedures. As an antibiotic it inhibits both Gram-positive and Gram-negative bacteria and is useful for a number of applications in therapeutics, veterinary medicine, industry and agriculture. It is also useful as a disinfecting agent and for separating mixtures of microorganisms for medical, diagnostic and research purposes.

SUMMARY OF THE INVENTION

Mitomalcin, a proteinaceous antibiotic and complexing agent, is produced during the cultivation, under controlled conditions, of a new species of microorganism which has been designated *Streptomyces malayensis*. The conditions comprise, in general, cultivation in an aqueous nutrient medium under submerged aerobic conditions at a temperature of from about 24°–30° C. and a pH of from about 5.5 to about 8.5 until substantial antimicrobial activity is imparted to the medium. The active principle is then recovered by dialysis of the fermentation broth or by adsorption on diethylaminoethylcellulose followed by elution with aqueous sodium chloride and dialysis of the eluate. It is purified chromatographically by means of a strongly basic anion exchange resin followed by elution with water and chromatography on diethylaminoethyl Sephadex.

BRIEF DESCRIPTION OF THE DRAWINGS

The accompanying drawings (FIGS. I and II) illustrate the characteristic ultraviolet and infrared absorption spectra of the product of this invention.

DETAILED DESCRIPTION OF THE INVENTION

The microorganism, isolated from a soil sample from Malaya, was found to have the properties of the genus Streptomyces, and was grown on media commonly used for the description and identification of species of this genus while comparing its cultural characteristics with those described by Waksman and Lechevalier, in "Actinomycetes and Their Antibiotics," The Williams & Wilkins Company, Baltimore, 1953. A culture of the new species, *Streptomyces malayensis*, has been deposited with the American Type Culture Collection, Washington, D.C. under the number ATCC 21163.

*S. malayensis* sp. nov. ATCC 21163, is identified in the culture collection of Chas. Pfizer & Co., Inc. as Isolate BA–6685.

The cultural characteristics of the new species, *Streptomyces malayensis*, are set forth in the following table, wherein the description given is based upon readings made after two weeks of growth. Classification of this new species, was made by Dr. John B. Routien, who proposed the name *Streptomyces malayensis*. The culture ATCC 21163 has been designated the type culture of this new species.

Table I.—*Streptomyces malayensis* sp. nov.
ATCC No. 21163

Aerial mycelium—Mostly abundant, near Mouse Gray to Deep Olive Gray (Ridgway) when colored; edge of colony often fimbriate and white.

Vegetative mycelium—Pale yellow to yellowish-brown but dark gray on tomato-paste-oatmeal agar and sometimes with pink tinge on synthetic and calcium malate agars.

Soluble pigment—No melanin. Slight yellow to yellow-brown in some media; in milk salmon at first, then pinkish vinaceous; pale brownish gray in potato plug.

Spores—Round to broadly elliptical, mostly 1.3 x 0.7$\mu$, covered with fine hairs that are slightly spiny (as determined by electron microscopy) but not as coarse as in *S. viridochromogenes*; in chains mostly of 10–20 spores in spirals of 4–5 turns. Branches forming spores arise alternate or opposite and sometimes verticillate but very frequently branching so as to form clusters of spirals.

Gelatin—Weak liquefaction.
Nitrates—Production of nitrites.
Starch—Weak hydrolysis.
Milk—Coagulation; slow and partial peptonization.
Ca malate—Digested.
$H_2S$ Production—$H_2S$ produced (detected by lead acetate strip test) from peptone in iron agar slants and shake flasks of peptone, proteose-peptone, tryptone and cysteine by hydrochloride and sometimes weakly from $Na_2S_2O_3$.
Cellulose—No growth.
Aerobiosis—Aerobic.
50° C.—No growth.
Carbon Sources—Grew on arabinose, dextrin, fructose, galactose, glucose, glycerol, inositol, inulin, lactose, maltose, mannitol, raffinose, rhamnose, salicin, sorbitol, starch, sucrose, trehalose and xylose. Sometimes grew on sodium acetate, aesculin, sorbose ($\pm$) and sometimes questionably grew on dulcitol.

This culture was compared with several species having hairy spores and was considered at first to be somewhat similar to *S. calvus*. The two cultures were compared side by side by growing them on the same media at the same time. ATCC 13382 was the strain of *S. calvus* that was used. The differences between these two cultures are listed below:

| | *S. malayensis*, ATTC 21163 | *S. Calvus*, ATCC 13382 |
|---|---|---|
| Pridham's yeast extract agar. | Vegetative mycelium gray-brown. | Vegetative mycelium nearly black. |
| Synthetic agar | Aerial mycelium produced. Vegetative mycelium brownish-yellow. | No aerial mycelium. Vegetative mycelium pale yellow. |
| Tomato-paste oatmeal agar. | Vegetative mycelium dark gray in center of reverse and gray brown at edge. | Vegetative mycelium yellow to dark gray. |
| Spores | Round to broadly elliptical. | Rod-shaped. |

In addition to this, there were differences on certain media not compared in the laboratory, but which were described for *S. calvus* by Waksman in "The Actinomyces," The Williams & Wilkins Company, Baltimore, vol. II, 187 (1961). Data from studies of BA–6685 were compared with the description of *S.. calvus*.

| | S. malayensis ATCC 21163 | S. calvus |
|---|---|---|
| Potato plug | No pigment produced | Pigment produced. |
| Gelatin | Aerial mycelium produced | No aerial mycelium produced. |
| $H_2S$ | Produced | Not produced. |

It has been observed that when spore suspensions of Isolate BA–6685 are cultured on a glucose (1%), yeast extract (1%), $K_2HPO_4$ (0.05%) agar at 28° C. at least nine types of variants, each having distinctly different morphological cultural characteristics are produced. Repeated transfer of the variants on this same medium showed the cultural characteristics are retained. The parent Isolate BA–6685 and six of the variants appear to lose their ability to produce mitomalcin after repeated transfer, and even on standing at room temperature or in the cold. The best method for maintaining these variants as well as the parent culture is to prepare a set of slants from a vegetative culture and to use them during a period of about two months. A new set of slants is then made from the master culture variant. The three remaining variants retained their ability to produce mitomalcin after two routine transfers. These are identified as Isolates BA–6685B, BA–6685H and BA–6685I in the culture collection of Chas. Pfizer & Co., Inc. Cultures of these three variants have been deposited with the American Type Culture Collection, Washington, D.C. under the ATCC numbers 21164, 21165 and 21166, respectively. A comparative study of the cultural characteristics of these three variants with those of the parent culture was made by Dr. Routien who proposed the names *Streptomyces malayensis* variants B, H and I, respectively.

The parent isolate, BA–6685, the three variants (BA–6685B, H and I) were transferred each to several slants of Pridham's Yeast-Extract Agar that would serve as propagating material for the comparative study.

The media used in the comparative study were as follows: Synthetic (Czapek's) Agar (Waksman, The Actinomycetes 1950, p. 193—Medium No. 1); Tomato Paste Oatmeal Agar (Pridham et al., Antibiotics Annual, 1956–1957, p. 951); Pridham's Yeast Extract Agar (Antibiotics Annual, 1956–1957, pp. 947–953); Gelatin (Gordon & Mihm, Jr. Bact. 73:15–27, 1957); Glucose Asparagine Agar (Waksman, The Actinomycetes, 1950; p. 193, Medium No. 2); Glucose Agar (10 g., peptone 10 g., beef extract 5 g., NaCl 5 g., agar 15 g., distilled water 1 liter); Nutrient Agar (Waksman, The Actinomycetes, 1950, p. 193, Medium No. 5), Starch Agar (potato starch 20 g., $NH_4Cl$ 0.5 g., agar 15 g., distilled water 1 liter); Calcium Malate Agar (Waksman, Bact. Rev. 221:1–29, 1957); Tyrosine Agar (Gordon & Smith J. Bact. 69:147–150, 1955); Glucose-Yeast Extract Agar [glucose (1%), yeast extract (1%), $K_2HPO_4$ (0.05%)]; Potato Plugs; Skimmed milk; Cellulose [$K_2HPO_4$ (1 g.), $MgNH_4PO_4$ (0.5 g.), distilled water 1 liter, pH 7.8; 8 ml. per tube, each tube containing a strip of filter paper extending above the broth]; Carbon Utilization (Pridham & Gottlieb, Jr. Bact. 56:107–114, 1948—basal agar); Dextrose Nitrate Broth (Waksman, *The Actinomycetes*, 1950, p. 193, No. 1 with 30 g. dextrose substituting for sucrose and agar omitted); Organic Nitrate Broth (Gordon & Mihm, Jr. Bact. 73:15–27, 1957), $H_2S$ Production (Difco Peptone Iron agar with and without yeast extract); Kandler and Kutzner medium: glycerol (10 g.), L-asparagine (1 g.), $K_2HPO_4$ (1 g.), NaCl (2 g.), $MgCl_2$ (0.5 g.), $CaCO_3$ (0.2 g.), $H_2O$ (1 liter) plus Kuster & Williams' (Applied Microbiol. 12:46–52, 1964) various S sources: cystein HCl (0.05 g./100 ml.), $Na_2S_2O_3$ (0.04 g./100 ml.), tryptone (1.75 g./100 ml.), peptone (1.61 g./100 ml.), proteose-peptone (1.56 g./100 ml.), all at pH 7, tested with lead acetate strips.

0.5 ml. of a spore suspension of the cultures was added to the tubes of the nitrate broths, to skimmed milk and flasks of media to test for $H_2S$ production. All other plates and slants were planted with loopfuls of the spore suspensions.

Cultures were incubated at 28° C. except where noted. Incubation was for various periods up to two weeks. Readings of results were recorded and are summarized below.

Starch hydrolysis—no hydrolysis except 2 mm. by BA–6685B after 14 days.

Gelatin liquefaction—5–8 mm. zone by all in 7 days, 10–12 mm. by all in 14 days.

Nitrate reduction—in three days all strains but BA–6685B had produced nitrites; finally after 14 days BA–6685B produced nitrites very weakly while the others gave a strong reaction for the presence of nitrites. This was true in both of the nitrate reduction media.

Skim Milk—BA–6685 in seven days had caused coagulation and peptonization and had produced a pink soluble pigment. The other cultures were slower in peptonization and soluble pigment production. After 14 days all were coagulated and peptonized and had a salmon colored soluble pigment. BA–6685 and BA–6685B had pH of 7.2; the other cultures were pH 6.8 (control was 6.6).

$H_2S$ production—seven days results after growing at 28° C. on a rotary shaker are shown in Table II.

TABLE II

| | BA–6685 | BA–6685H | BA–6685H | BA–6685I |
|---|---|---|---|---|
| Basal | — | — | — | — |
| Cysteine | Strong + | Strong + | Strong + | Strong + |
| $Na_2S_2O_3$ | Weak + | — | — | — |
| Peptone | + | + | + | + |
| Tryptone | + | Strong + | Strong + | Strong + |
| Proteose Peptone | Strong + | Strong + | Strong + | Strong + |

On peptone-iron-agar both with and without 0.1% yeast extract, all cultures gave $H_2S$ in 3 days.

Cellulose—none of the cultures used cellulose.

Calcium malate—digestion.

Carbon sources—all cultures grew equally well or essentially so on the following: arabinose, dextrin, fructose, galactose, glucose, glycerol, inositol, inulin, lactose, maltose, mannitol, raffinose, rhamnose, salicin, sorbitol, starch, sucrose, trehalose, xylose, Na acetate, aesculin, sorbose and dulcitol. On sorbose all gave ± growth; on dulcitol growth was questionable for BA–6685 and BA–6685B but definitely negative for BA–6685H and BA–6685I.

Oxygen requirement—all strains were alike in being aerobic.

Growth at 50° C.—all strains alike in not growing at 50° C. but did grow at 28° C.

Potato plug—growth good; no aerial mycelium; vegetative mycelium dull grayish brown; brown soluble pigment.

BA–6685B—like BA–6685 except color of vegetative mycelium and soluble pigment pale.

BA–6685H—like BA–6685.

BA–6685I—like BA–6685.

Aerial mycelium—after 14 days of incubation the cultures on different media were compared.

BA–6685—growth good on all media. No spores on glucose agar or nutrient agar. Spore color (Ridgway)—Olive Gray to Deep Olive Gray on glucose asparagine, synthetic, Pridham's, tomato paste oatmeal, calcium malate tyrosine. Spore color Light Mouse Gray to Mouse Gray on gelatin, starch and glucose-yeast extract.

BA–6685B—growth poorer than BA–6685 so growth is thinner and less sporulated. Spore color like BA–6685 except as follows: no aerial mycelium on glucose asparagine agar; very little sporulation on synthetic agar; naked on glucose agar; thin, white on nutrient agar; pale Olive Gray on tomato paste oatmeal agar; growth very thin with little aerial mycelium on tyrosine.

BA–6685H—very similar to BA–6685 except as follows: on synthetic agar aerial mycelium limited to edge of colony as white, fimbriate margin, center of colony Cinnamon-Brown in color; on Tyrosine Agar spore color near Mouse Gray.

BA–6685I—similar to BA–6685 except as follows: on synthetic agar no sporulation but white aerial mycelium; on glucose agar colony naked; on calcium malate sporulation more vigorous.

Substrate Mycelium—BA–6685, Pale yellowish to yellowish brown to brownish gray on various media (pale yellow on gelatin, nutrient, calcium malate; yellow on tyrosine; yellowish brown on synthetic and glucose agars; yellowish brown with gray on glucose asparagine agar, glucose-yeast extract agar and Pridham's yeast extract agar; light gray on starch).

BA–6685B—like BA–6685 except as follows: yellow-brown on starch; yellow-olive on glucose asparagine agar; yellow brown on glucose-yeast extract agar; pale translucent yellow brown on synthetic; dark brown on Pridham's yeast extract agar; pale yellowish olive on tyrosine.

BA–6685H—like BA6685 except as follows: yellowish brown on gelatin; light orange brown on glucose asparagine agar; light brownish orange on synthetic; brown on Pridham's yeast extract agar; yellowish brown on tyrosine agar.

BA–6685I—identical with BA–6685H and therefore different from BA–6685 in the same ways.

Soluble Pigments—BA–6685, no soluble pigment except pale yellow in synthetic and yellow in glucose agar and tyrosine agar.

BA–6685B—same as BA–6685 except for numerous media; yellow on glucose asparagine, synthetic, Pridham's yeast extract agar; yellowish brown on glucose peptone and tyrosine; light brown on glucose agar and tomato paste oatmeal.

BA–6685H—like BA–6685 except light brown on glucose-peptone and tomato paste oatmeal; yellow on glucose agar and synthetic; light yellowish brown on tyrosine agar.

BA–6685I—like BA–6685 except yellow on glucose asparagine, synthetic and glucose peptone agars; light brown on tomato paste oatmeal; light yellowish brown on tyrosine agar.

Morphology of chains of spores—all cultures were basically the same, but in BA–6685B many coils were more open and there were fewer chains.

Spore shape—all strains alike: spores rod shaped, mostly $1.0 \times 0.7\mu$.

Spore surface—all strains with thin, spiny projections.

It is to be understood that the present invention is not limited to use of the aforesaid organisms or to organisms fully answering the above descriptions, which are given only for illustrative purposes. It is especially desired and intended to include the use of naturally occurring or artificially induced mutants and/or variants, such as those which can be producer from the described organisms by arious means, including X-radiation, ultra-iolet radiation, treatment with nitrogen mustards, and the like.

This invention includes within its scope processes for growing the microorganisms S. malayensis ATCC 21163 and its variants ATCC 21164, 61165 and 21166. The cultivation of these microorganisms preferably takes place in aqueous nutrient media at a temperature of from about 24°–30° C., an initial pH from about 5.5–8.5, and under submerged, aerobic conditions with agitation. An initial pH of from about 5.5 to 7 is preferred since it affords improved yields of product. Nutrient media which are useful for such purposes include a carbohydrate, such as sugar, starch, glycerol, corn meal; a source of organic nitrogen, such as casein, soy bean meal, peanut meal, tryptone, wheat gluten, cotton seed meal, lactalbumen, enzymatic digest of casein. A source of growth substances, such as distiller's solubles, yeast extract, molasses extract residues, as well as mineral salts, such as sodium chloride, potassium chloride, potassium phosphate, magnesium sulfate, and trace minerals such as copper, zinc and iron, may also be utilized with advantageous results. A particularly useful and preferred medium is one containing glucose, soybean meal and potassium phosphate. If excessive foaming is encountered during fermentation, anti-foam agents such as vegetable oils, may be added to the fermentation medium. The pH of the fermentation tends to remain rather constant, but if variations are encountered, a buffering agent such as calcium carbonate may also be added to the medium.

Inoculum for the preparation of mitomalcin may be obtained by employing growth from slants of the aforesaid microorganisms on such media as Emerson's agar or beef lactose. The growth may be used to inoculate either shake flasks or inoculum tanks, or alternatively, the inoculum tanks may be seeded from the shake flasks. The growth of the microorganism usually reaches its maximum in about one or two days. However, variations in the equipment used, aeration, rate of stirring, and so forth, may affect the speed with which the maximum activity is reached. In general, the fermentation is continued until substantial antimicrobial activity is imparted to the medium, a period of from about 18 hours to about 72 hours being sufficient for most purposes. Maximum potency is attained over a 21 to 28 hour period. Optimum anti-leukemia and anti-microbial activity are present at this time. Aeration of the medium in tanks for submerged growth is preferably maintained at the rate of about ½ to 2 volumes of free air per volume of broth per minute. Agitation may be maintained by means of agitators generally familiar to those in the fermentation industry. Aseptic conditions must, of course, be maintained throughout the transfer of the microorganisms and throughout their growth.

After growth of the microorganism, the mycellium may be removed from the fermentation broth by filtration, centrifugation, or the like. Thereafter, the mitomalcin can be recovered by several different procedures. Alternatively, the filtered broth may be used as is or it may be dried. Preferably, however, the products are further purified as is described below.

Mitomalcin, the proteinaceous agent elaborated by S. malayensis ATCC 21163 and variants thereof described herein cannot be extracted from its fermentation broths by the common organic solvents (benzene, toluene, chlorofrom, carbon tetrachloride, methylene chloride, ethylene chloride, petroleum ether, diethyl ether, n-butanol) or by phenol. It is, in fact, subject to rapid denaturation innonaqueous media, as well as in aqueous soutions above pH 8. It is not adsorbed from broths or from aqueous solutions containing it by adsorbents such as carbon and Fuller's earth (a magnesium aluminum silicate), and is non-dialyzable through cellophane membranes. This denaturation in the presence of solvents and non-dialyzability suggested the product to be proteinaceous in nature. It is, however, adsorbed on diethylaminoethyl cellulose (DEAE-cellulose) from which it is readily eluted by aqueous sodium chloride.

Several methods can be used to recover mitomalcin from aqueous solutions, e.g. fermentation broths, containing it. In one method the culture liquid is filtered using 1–2% diatomaceous earth. The filtrate is concentrated under reduced pressure (<35° C.) to about 10% of the original volume. The concentrate is clarified then dialyzed against tap water for 24 hours at 5° C. and the contents of the bag freeze-dried. The freeze-dried solid thus obtained is active against leukemia L–1210.

In a second method, the concentrated broth is stirred with enough ammonium sulfate to give a 67% saturated solution (approximately 42 g./100 ml.) at 5° C. Diatomaceous earth (2–5%) is added to the mixture which is then filtered. The cake is washed with 67% saturated ammonium sulfate and is next stirred with 2% sodium chloride solution equal in volume to 1% of that of the original broth. The mixture is filtered and the cake extracted once more with the same volume of 2% aqueous sodium chloride. The combined salt extracts are dialyzed against tap water for two days and freeze-dried to give the product.

In still another method, the concentrated and dialyzed broth is passed through a column of DEAE-cellulose (diethylaminoethyl cellulose) in 0.01 M phosphate buffer (pH 7.0). The quantity of the DEAE-cellulose is approximately 1–3 g. per liter of the original broth. After the sample is passed through the column it is washed with three bed volumes 0.01 M phosphate buffer (pH 7). Elution is carried out with 4% sodium chloride in 0.01 M. phosphate buffer using a volume equal to 1–2% of the volume of the original broth. The eluate is dialyzed against tap water and freeze-dried to give the product.

The three methods described above can be used with broth made in any medium. The following two methods, appicable only when media with minimal salt content (<3%) are used eliminate the concentration and dialysis of the filtered broth. In the first method the filtered broth is directly passed through the DEAE-cellulose column (1–3 g. per liter) prepared in 0.01 M phosphate buffer. After the broth is passed through the column, washing and elution are carried out as described above. The eluate is dialyzed and recovered by freeze-drying.

The second and preferred method for the recovery is as follows: The filtered broth is stirred with DEAE-cellulose (app. 1–2 g./liter) for 30 minutes and the mixture filtered. The filtrate may be stirred once more with half as much DEAE-cellulose and filtered for a more complete adsorption of the activity. All the activity is adsorbed on the DEAE-cellulose which is then eluted twice with 4% aqueous sodium chloride equal in volume to 1–2% of the original broth. The eluate is dialyzed for 24 hours against tap water and, if desired, freeze-dried to afford the crude solid product. For further purification the eluate, or an aqueous solution of crude solid product obtained by the above method, is subjected to chromatography on the chloride, phosphate or acetate salt form of a strong anion exchange resin such as Dowex-1, Amberlite IRA–400, De-Acidite FF (all of which are strongly basic anion exchangers of polystyrene containing —NMe$_3$+ groups and available from the Dow Chemical Co., Rohm & Haas Co., and The Permutit Co., Ltd., respectively). The phosphate forms of these resins appear to give slightly better recovery of mitomalcin than do the other salt forms. An aqueous solution of the crude sample is passed through the resin column which is subsequently washed with water. The active material appears in the effluent and wash whereas 70–90% of the extraneous optical density at 280 m$\mu$ and most of the color is adsorbed. The combined effluent and wash are dialyzed then freeze-dried.

The freeze-dried product is then subjected to chromatography on the weakly basic ion exchanger DEAE-Sephadex (diethylaminoethyl derivative of Sephadex, a cross-linked dextran bearing diethylaminoehyl function groups, available from Pharmacia, Uppsala, Sweden), 3–6 g. per g. of sample.

The Sephadex is swelled in 0.01 M phosphate buffer (pH 7), washed with buffer and charged with the sample dissolved in a minimum volume of water. The column is eluted with a linear sodium chloride (0 to 1%) gradient in 0.01 M phosphate buffer (pH 7). The active fractions, determined by bio-plate activity against B. subtilis and optical density at 250 and 280 m$\mu$, are combined, dialyzed and freeze-dried to give a cream-colored solid.

Further purification is accomplished by repetition of this column procedure or, preferably, by chromatography over Sephadex G–100 (a weakly acidic, cross-linked dextran containing carboxymethyl groups; available from Pharmacia, Uppsala, Sweden).

The Sephadex column, swelled in 0.1 M ammonium carbonate buffered to pH 7.5 with formic acid, is charged with the sample dissolved in a minimum volume of the buffer. The column is eluated with a linear sodium chloride gradient (0–1%) in the same buffer. An alternative to this elution comprises the use of water or 0.0025 M acetic acid as eluting agent.

The product thus obtained is stable in the pH range of 1–8. It is a white, thermally labile, amorphous powder having no definite melting point but which decomposes gradually at 250°–270° C. The ultraviolet absorption spectrum (FIG. 1) in water shows broad peaks at 3$\angle$5–330 m$\mu$ and a well-defined maximum at 276 m$\mu$ with $E_{1\,cm.}^{1\%}$ values of 15–18

In alkaline solution the low wavelength peak is shifted to 250 m$\mu$ with $E_{1\,cm.}^{1\%}$ value of 38

The infrared spectrum (2% by weight in KBr pellet) shows strong peaks at 3.05, 6.05, 6.55, 7.20, 8.05 and 9.30 (FIG. 2). Precipitation with ammonium sulfate takes place at 50–75% saturation with retention of activity. The activity is stable in aqueous solutions with low pH (1–3) but not at high pH (8–11). It is quite nondialyzable through the ordinary cellophane membranes. The compound also exhibits antibacterial activity, particularly against gram-positive bacteria.

The amino acid composition of mitomalcin, determined on its acid hydrolyzate with a Technicon Amino Acid Auto Analyzer (Technicon Corp., Ardsley, New York) is given in Table III. The numerical values given are representative values of the pure material.

TABLE III

| Amino acid | $\mu$moles/mg. | Percent |
| --- | --- | --- |
| Asparatic | 0.663 | 10.28 |
| Threonine | 0.709 | 10.99 |
| Serine | 0.523 | 8.11 |
| Glutamic | 0.346 | 5.36 |
| Proline | 0.370 | 5.74 |
| Glycine | 0.930 | 14.42 |
| Alanine | 1.012 | 15.69 |
| Valine | 0.701 | 10.87 |
| Cystine | 0.087 | 1.35 |
| Isoleucine | 0.100 | 1.55 |
| Leucine | 0.365 | 5.66 |
| Tyrosine | 0.055 | 0.85 |
| Phenylalanine | 0.274 | 4.25 |
| Lysine | 0.104 | 1.61 |
| Histidine | 0.025 | 0.39 |
| Arginine | 0.181 | 2.81 |
| (Ammonia | 1.135 | 17.59) |

Additionally, the following amino acids have been detected: allo-3-hydroxyproline, n-hydroxyproline, allo-hydroxyproline, $\alpha$-aminoisobutyric acid, 3-methylhistidine, carnosamine.

Its molecular weight as determined by chromatographic techniques on the weakly acidic exchanger, Sephadex G–100 (Determann et al., J. Chromatog. 255, 303–313, 1966) is about 17,400.

The activity in aqueous solution appears to be stable for at least six months if kept frozen and freeze-dried solids retain activity for at least two years if kept refrigerated.

Mitomalcin exhibits significant activity in mice against lymphoid leukemia L–1210 and acute lymphocytic leukemia P–388. It is slightly active against the Walker 256 carcinosarcoma.

Anaphylaxis could not be elicited in mice injected with 0.1 mg./kg. of mitomalcin.

Although mitomalcin may be administered parenterally, either as an aqueous solution or dissolved in physiological saline, in the treatment of various infections in animals, various types of pharmaceutical preparations may advantageously be compounded therewith. These preparations may include both liquid diluents suitable for extemporaneous preparations of solutions prior to administration. Illustrative of such diluents are: propylene glycol, diethylcarbonate, glycerol, sorbitol, etc. While other routes of administration are possible, the parenteral routes are generally preferred. The various dosage forms may contain buffering agents, as well as local anesthetics and inorganic salts to afford desirable pharmacological properties.

For most purposes, the solid preparations of mitomalcin should contain the compounds in an amount of at least 0.05 mcg./mg. of the composition. Liquid preparations containing the active ingredient may be administered directly, e.g. by syringe, or more desirably, by infusion. For direct administration an aqueous solution containing up to 0.5 mg. per ml. of solution is convenient. For infusion the active ingredient is desirably diluted, for example, with isotonic glucose to one liter and administered gradually over a 6-8 hour period. The liquid preparations, such as aqueous solutions, are particularly advantageous when the compound is employed in an amount of from about 0.1 to 2.5 mg./ml. of solution or suspension. Preparations comprising pure mitomalcin can, of course, be used. The most effective dose of mitomalcin appears to be 0.9–1.0 mg./kg. Excellent antibacterial activity is observed from 0.5 to 1.0 mg./kg. When used as an antibiotic it can also be used by topical application in the usual extending media familiar to those skilled in the art.

Mitomalcin can also be advantageously employed in combination with other pharmaceutically acceptable compounds such as the tetracycline-type antibiotics, carbomycin, neomycin, bacitracin, tylosin, sulfomethiazine, pencillin-type antibiotics, and the like.

Mitomalcin, as noted, is active as an antibiotic agent. Its in vitro antibacterial spectrum, determined under standardized conditions in which nutrient broth containing various concentrations of the test material is seeded with the particular organisms and the minimum concentration (MIC) at which growth of the organism failed to occur is observed and recorded.

TABLE IV.—IN VITRO ANTIBACTERIAL SPECTRUM

| Organism: | MIC (mcg./ml.) |
| --- | --- |
| Staphylococcus aureus 5 | 3.12 |
| Staphylococcus aureus 400 | 1.56 |
| Streptococcus pyogenes 8668 | 0.78 |
| Streptococcus pyogenes C203 | 0.39 |
| Streptococcus faecalis | 3.12 |
| Diplococcus pneumoniae | 0.39 |
| Erysipelothrix rhusiopathiae | 0.39 |
| Aerobacter aerogenes | >100 |
| Escherichia coli | >100 |
| Proteus vulgaris | >100 |
| Pseudomonas aeruginosa | >100 |
| Salmonella typhosa | >100 |
| Klebsiella pneumoniae | >100 |
| Vibrio comma | 3.12 |
| Pasteurella multiocida | 12.5 |
| Sarcina lutea | 1.56 |
| Bacillus subtilis | 6.25 |
| Staphylococcus aureus 209P | 3.12 |
| Shigella sonnei | 50 |

Example I.—A neutrient medium is prepared from the following materials per liter of water:

| | Gms./liter |
| --- | --- |
| Dextrose | 3.0 |
| Glycerol | 3.0 |
| Lactose | 3.0 |
| Peptone | 0.5 |
| Asparagine | 0.5 |
| NaNO$_3$ | 0.5 |
| Urea | 0.5 |
| Corn steep liquor | 0.5 |
| Beef extract | 0.5 |
| Distillers solubles | 0.5 |
| Yeast extract | 0.5 |
| Wheat germ | 0.5 |

Tap water to volume. Boil 10 minutes, homogenize, filter, adjust to pH 7.0 before sterilizing at 15 lbs. steam pressure for ½ hour.

The sterile, cooled culture broth (250 ml. per one liter capacity Erlenmeyer flask) is inoculated with a 10-day slant growth of S. malayensis ATCC 21163 and placed on a rotary shaker for 70 hours at 28° C. The culture broth is then filtered over glass wool to remove the larger growth particles and the filtrate passed oer sterile Seitz s-1 porosity ultrafilters. The sterile ultrafiltrate is used for bioassays against sarcoma 180, adenocarcinoma 755 and lymphoid leukemia 1210 conducted in accordance with CCNSC protocol (Cancer Chemotherapy Reports 25, 1–3 (1962); Protocols 1·301–1·303).

The results of the bioassays show the fermentation broth to be highly active against lymphoid mouse leukemia L–1210.

Similar results are obtained when S. malayensis ATCC 21164, 21165 and 21166 are substituted for S. malayensis ATCC 21163.

Example II.—The procedure of Example I is repeated using S. malayensis ATCC 21163 on the following medium:

| | Percent |
| --- | --- |
| Glucose | 1 |
| Soybean meal | 1.5 |
| Dipotassium phosphate | 0.2 |
| Distiller's solubles | 0.25 |
| Calcium carbonate | 0.2 |
| Sodium chloride | 0.2 |
| Tap water to volume. | |

The culture liquid is filtered using 1–2% Hyflo-Supercel (a specially processed diatomaceous earth available from Johns-Manville Co., N.Y.). The filtrate is concentrated under reduced pressure and below 35° C. to about 10% of its original volume. The concentrate is then dialyzed for two days against tap water at 5° C. and the contents of the bag then freeze-dried. The residue of crude mitomalcin thus obtained is active against leukemia L–1210.

Repetition of this procedure with S. malayensis ATCC 21164, 21165, and 21166 gives similar results.

Example III.—The procedure of Example I is again repeated but using the following medium:

| | Percent |
| --- | --- |
| Glucose | 0.3 |
| Glycerol | 0.3 |
| Lactose | 0.3 |
| Peptone | 0.05 |
| Sodium nitrate | 0.05 |
| Beef extract | 0.01 |
| Yeast extract | 0.03 |
| Urea | 0.05 |
| Distiller's solubles | 0.05 |
| Corn steep liquor | 0.05 |
| Tap water to volume. | |

The culture liquid is filtered through Hyflo Supercel (1–2%) and the filtrate concentrated under reduced pressure and below 35° C. to one-tenth its original volume. The concentrate is stirred with enough ammonium sulfate to give a 67% saturated solution (approximately 42 g./100 ml.) at 5° C. Supercel (2–5%, a diatomaceous earth available from Johns-Manville Co., N.Y.) is added to the mixture which is stirred then filtered. The filter cake is washed with 67% saturated ammonium sulfate and is next stirred with 2% sodium chloride solution equal in volume to 1% of the original broth. The mixture is filtered and the cake extracted once more with the same volume of 2% aqueous sodium chloride. The combined salt extracts are dialyzed against tap water for two days and freeze-dried. The product obtained is active against leukemia L–1210.

Example IV.—The procedure of Example I is repeated with *S. malayensis* ATCC 21163 but the culture liquid is worked up as follows:

The filtrate obtained by filtering the culture liquid through Hyflo-Supercel is stirred with DEAE-cellulose (app. 1–2 g./liter) for 30 minutes and the mixture filtered. (The filtrate may be stirred once more with half as much DEAE-cellulose and filtered for a more complete adsorption of the activity.) Almost all the activity is adsorbed on the DEAE cellulose which is then eluted twice with 4% aqueous sodium chloride equal in volume to 1–2% of the original broth. The eluate is dialyzed for 24 hours against tap water and freeze-dried. The crude mitomalcin product at this stage is active against leukemia L–1210.

Example V.—The product of Example IV is purified by dissolution in water to form a 5% solution and chromatography on Dowex-1 resin, phosphate form. The resin is prepared by washing a column of the chloride form with 0.2 M phosphate buffer (pH 7) until the wash is of low chloride content. The column is then washed with water until free of phosphate ion. About 10 g. of resin are used per gram of the freeze-dried crude mitomalcin.

The column after passage of the mitomalcin solution is washed with water and the effluent and wash solutions collected, combined, then freeze-dried to provide mitomalcin showing activity against leukemia L–1210.

Further purification is accomplished by chromatographing the above product on a DEAE-Sephadex column. The column is prepared in 0.01 M phosphate buffer (pH 7) using 3–6 g. of DEAE-Sephadex per gram of mitomalcin. The sample is made up into a 5% solution in the same buffer, dialyzed against the buffer for 3–6 hours, then added to the column. The column is eluted with 0.01 M phosphate (pH 7), 1%, 2%, and 4% sodium chloride in the same buffer. The changes in the eluant are made when the optical density at 280 m$\mu$ reaches low values following a peak. As a typical behavior, the buffer wash usually brings out 1–2% of the optical density. The 1% sodium chloride brings out two or three optical density peaks. When these fractions are read at both 250 and 280 m$\mu$ and the ratio of the two values computed, it is shown that the first two peaks have a 250/280 ratio of 0.7–0.9 whereas the third peak has a ratio of 0.45–0.65. Occasionally the third peak is eluted slowly with 1% sodium chloride but is eluted rapidly when changed to 2% sodium chloride. The last eluant, 4% sodium chloride, has only 5–10% of the total optical density. The three peaks which appear with either 1 or 2% sodium chloride account for 50–70% of the total optical density.

Example VI.—*S. malayensis* ATCC 21164 subculture (slant) is retained on composite agar slants formulated respectively as A and B:

| Medium A: | Percent |
|---|---|
| Glucose | 0.3 |
| Glycerol | 0.3 |
| Lactose | 0.3 |

| Medium A: | Percent |
|---|---|
| Beef extract | 0.05 |
| Yeast extract | 0.05 |
| Peptone | 0.05 |
| NaNO$_3$ | 0.05 |
| Urea | 0.05 |
| Grain solubles | 0.05 |
| Corn steep liquor | 0.05 |
| Wheat germ | 0.05 |
| Asparagine | 0.05 |

| Medium B: | Percent |
|---|---|
| Glucose | 1 |
| Yeast extract | 1 |
| K$_2$HPO$_4$ | 0.05 |
| pH 6.9–7.0. | |

Agar is added (1.5%) to the medium, the mixture is heated to effect solution and sterilized.

Transfers from the subculture are made either by plug withdrawal or spore suspension into one liter seed culture preform flasks. The inoculated flasks are incubated for 20–24 hours at 27–29° C., on a reciprocating (150 r.p.m.) shaker when Medium C is used or 40–60 hours when Medium A is employed.

| Medium C: | Percent |
|---|---|
| Cornstarch | 2 |
| Soybean meal | 2 |
| Yeast extract | 0.5 |
| MnCl$_2$ | 0.005 |
| CuSO$_4$ | 0.005 |
| ZnSO$_4$ | 0.005 |
| CaCO$_3$ | 0.2 |
| NaCl | 0.25 |

The medium (D) is added to a 300 gallon fermentation tank in 140 to 200 gallons of water.

| Medium D: | Percent |
|---|---|
| Glycerol | 0.9 |
| Peptone | 0.05 |
| Beef extract | 0.05 |
| Urea | 0.05 |
| NaNO$_3$ | 0.05 |
| Yeast extract | 0.05 |
| Corn steep liquor | 0.05 |
| Distiller's solubles | 0.05 |
| Asparagine | 0.05 |
| Wheat germ | 0.05 |

The prepared tank is autoclaved by steam injection for 25–35 minutes at 125° C./20–22 p.s.i. after which the preform is added until a final concentration of approximately 1% is obtained. The broth is stirred at 300 or 1100 r.p.m., at 27–28° C. The air rate is kept at a constant 0.5 cu. ft./hr./gal., and foaming controlled after autoclaving by sterilized soybean oil. The fermentation is terminated after 24 hours.

In the recovery step, the mycelia are removed by passing the broth through a filter plate press at 20–30 p.s.i. DEAE-cellulose (1–2 g./l.) is then stirred into the filtrate for 30–40 minutes and the mixture is again passed through a plate press. The filtrate is re-treated with DEAE-cellulose. Both cakes are washed with water and blown dry. This serves to remove the active principle quantitatively from the broth. The raffinate is discarded, the cellulose cakes are stirred in 4% NaCl and filtered. The process is repeated and the combined eluates are dialyzed (continual flow) at 5–10° C. The salt-free brown solution will usually produce 20–25 mm. zones on synthetic *B. subtilis* plates.

Ten grams of fresh Dowex-1 (X–4) phosphate [1] is

---
[1] Dowex-1 phosphate is prepared as follows: Dowex-1 chloride is washed first with 1 N phosphoric acid followed by water until the eluate pH levels at 4.5–5.0. The pH is then brought to 6.5–7.0 by eluting with 0.1 molar phosphate buffer (pH 7.0). Excess buffer is removed with a subsequent water wash.

stirred into the DEAE-cellulose eluate per gram of expected solids yield. (150 gal. of broth will generate after centration of antibiotic. This coincides with a readily discernible change in the ultraviolet fingerprint (Table V).

TABLE V

Properties characteristic of the active principle from DEAE-Sephadex (A typical example)

| Fraction number | Ultra-violet, mµ | Bio-plate activity zone, mm. | O.D. ratio |
|---|---|---|---|
| 85 | 260 (min.), 280 (max.), 305 (min.), 325 (max.) | 18 | 325/280=0.9 |
| 88 | | 22 | |
| 91 | 260 (min.), 276 (max.), 290 (infl.), 325 (brd. sh.) | 26 | 235/276=0.75 |
| 94 | 260 (min.), 276 (max.), 290 (infl.), 325 (brd. sh.) | 27 | 225/276=0.65 |
| 97 | 260 (min.), 276 (max.), 290 (infl.), 325 (brd. sh.) | 27 | 325c276=0.65 |
| 100 | | 26 | |
| 103 | | 24 | |
| 106 | | 21 | |
| 109 | | NZ | |
| 115 | 260 (min.), 280 (max.), 305 (min.), 325 (max.) | NZ | 325/280=0.8 |

Note.—Brd. sh.=broad shoulder. NZ=no zone. Infl.=inflection.

DEAE-cellulose treatment, about 50–75 g. of freeze-dried solid). This is equivalent to 30 mg./cc. The suspension is filtered and the resulting light-yellow solution is freeze-dried. A second dialysis further refines the product.

A cream colored solid (15–30 g. per 150 g. fermentation) is obtained which shows 25–30 mm. zones on synthetic *B. subtilis* and which demonstrates significant activity against leukemia L-1210.

Example VII.—Repetition of the procedure of Example VI but using the following medium during fermentation in place of Medium D produces substantially the same results:

|  | Percent |
|---|---|
| Cerelose (dextrose hydrate) | 0.5 |
| Glycerol | 0.4 |
| NZ Amine YTT | 0.1 |
| Peptone | 0.05 |
| Beef extract | 0.1 |
| KCl | 0.1 |
| $CaCO_3$ | 0.05 |

Example VIII.—The procedure of Example VI is again repeated but the eluate from the DEAE-cellulose column, after dialysis, is decolorized by passage over Dowex-1 phosphate. However, in this and all subsequent steps, pyrogen free water is used.

Further purification is accomplished by chromatography on a DEAE-Sephadex (A–50) column.

The optical density measurements suggest a second antibiotic is present. However, no other fraction other than that described above elicits an anti-leukemic response. Fractions 90–105 are combined, dialyzed and freeze-dried to give approximately a 6.5 percent yield of a cream-colored solid which can be assayed turbidimetrically against *Staphylococcus aureus* 5. Activity is found in the range of 5–10γ. Antileukemic [2] efficacy is observed in the dose range of 0.1–1.0 mg./kg.

The final step in the purification entails chromatographic separation of the material, obtained from DEAE-Sephadex, over Sephadex G–100. For the best results the substrate/sample ratio is about 50:1 on a dry weight scale. The Sephadex G–100 is swelled in 0.1

$$M(NH_4)_2CO_3$$

buffered to pH 7.5 with formic acid. The column is then charged with a sample dissolved in a minimum volume of this buffer. As before, the separation is followed as a function of optical density at 250 and 280 mµ as well as bio-plate activity versus synthetic *B. subtilis*. The heart cut, i.e. those fractions exhibiting the highest plate activity, is freeze-dried to give a 70 percent yield of a white, fluffy, water soluble solid. (Table VI summarizes the properties of the product.)

TABLE VI

Properties characteristic of the active principle from Sephadex G–100 (A typical example)

| Fraction No. | Ultra-violet, mµ | O.D. rates |
|---|---|---|
| 20 | 260 (min.), 276 (max.), 290 (infl.), 325 (brd. sh.) | 260/276=0.93; 325/276=0.43 |
| 21 | 260 (min.), 276 (max.), 290 (infl.), 325 (brd. sh.) | 260/276=0.90; 325/276=0.33 |
| 23 | 260 (min.), 276 (max.), 290 (infl.), 325 (brd. sh.) | 260/276=0.88; 325/276=0.32 |
| 24 | 260 (min.), 276 (max.), 290 (infl.), 325 (brd. sh.) | 260/276=0.90; 325/276=0.33 |
| 25 | 260 (min.), 276 (max.), 290 infl.), 325 (brd. sh.) | 260/276=0.97; 325/276=0.38 |
| 26 | 280 (sh.)    330 (brd. sh.) | 330/280=0959 |
| 27 | End absorption only | |

A dry weight of three grams of DEAE-Sephadex A–50 (a moderately cross-linked, weakly basic exchanger) is used per gram of sample. The Sephadex is swelled in 0.01 M phosphate buffer (pH 7) which results in a 20-fold volume increase. The column is washed thoroughly with buffer and charged with the sample dissolved in a minimum volume of water. The column is eluted with a one percent sodium chloride gradient in 0.01 M phosphate buffer (pH 7). Separation is followed as a function of optical density at 250 and 280 mµ as well as by bio-plate activity versus *B. subtilis* grown in synthetic media. A heart cut is taken in accordance with the highest con- The product thus obtained is: homogeneous on electrophoresis at pH 8.8, denatured by organic solvents, stable to acid pH but not to alkaline conditions, thermally labile, readily soluble in water, insoluble in the common organic solvents, non-dialyzable through standard cellophane membranes, highly active against a number of gram-positive and gram-negative bacteria, completely non-pyrogenic and active turbidimetrically (against *S. aureus* 5) in the range of 1–5γ.

The activity of mitomalcin against leukemia L-1210 is demonstrated below. A series of five batches produced by this method when assayed on the standard leukemia

---
[2] L-1210.

L-1210 ("Revised Protocols for Screening Chemical Agents and Natural Products Against Animal Tumours and Other Biological Systems," CCNSC, Bethesda, Md., Nov. 6, 1962) gave the following results (Table VII). The drug is administered intraperitoneally on days 1–15 following challenge. Table VIII presents the values obtained in a study involving treatment on days 1–9. (The symbol ">" indicates long term surviving mice, that is, at least 4 out of 6 still survive after 30 days.)

What is claimed is:

1. The process which comprises cultivating *Streptomyces malayensis* ATCC 21163, 21164, 21165 or 21166 in an aqueous nutrient medium under submerged aerobic conditions, at a temperature of from about 24° C. to about 30° C. and a pH of from about 5.5 to about 8.5 for a period of from about 18 hours to about 72 hours, until substantial antibacterial activity is imparted to such medium.

2. The product obtained by the process of claim 1.

TABLE VII

Evaluation of five batch concentrates of mitomalcin on leukemia L-1210

| Batch | Dose, mg./kg. | Survival rate | Percent of control | Batch | Dose, mg./kg. | Survival rate | Percent of control |
|---|---|---|---|---|---|---|---|
| A | 4 | 3/6 | a 46 | B | 0.5 | | 153 |
| A | 3 | 6/6 | 81 | B | 0.4 | 6/6 | 168 |
| A | 2 | 6/6 | 47 | B | 0.3 | 5/6 | 171 |
| A | 1 | 6/6 | 139 | B | 0.2 | 6/6 | 162 |
| A | 0.9 | 6/6 | 223 | B | 0.2 | 6/6 | 139 |
| A | 0.8 | 6/6 | 200 | B | 0.1 | 6/6 | 142 |
| A | 0.7 | 6/6 | 182 | B | 0.05 | 6/6 | 141 |
| A | 0.6 | 5/6 | 221 | B | 0.05 | 6/6 | 126 |
| A | 0.5 | 6/6 | 304 | B | 0.05 | | 108 |
| A | 0.5 | 6/6 | 275 | B | 0.03 | 6/6 | 111 |
| A | 0.1 | 5/6 | 188 | | | | |
| A | 0.05 | 6/6 | 162 | | | | |
| B | 2 | 6/6 | a 81 | C | 1.5 | | 88 |
| B | 1.5 | 6/6 | 132 | C | 1.0 | | 208 |
| B | 1.5 | 6/6 | >234 | C | 0.9 | | >250 |
| B | 1 | | >229 | C | 0.8 | | 191 |
| B | 1 | 6/6 | 150 | C | 0.8 | | >225 |
| B | 1 | 6/6 | 374 | C | 0.7 | | >244 |
| B | 0.9 | 6/6 | 233 | C | 0.6 | | >265 |
| B | 0.9 | | >212 | C | 0.5 | | 221 |
| B | 0.8 | 6/6 | 283 | C | 0.5 | | 147 |
| B | 0.8 | | 163 | D | 1.5 | | >206 |
| B | 0.8 | 6/6 | 164 | D | 1.0 | | >239 |
| B | 0.7 | 6/6 | 214 | D | 0.9 | | 220 |
| B | 0.7 | | 157 | D | 0.8 | | >227 |
| B | 0.6 | 6/6 | 220 | D | 0.7 | | >218 |
| B | 0.6 | | 153 | D | 0.6 | | 141 |
| B | 0.6 | 6/6 | 207 | D | 0.5 | | 154 |
| B | 0.5 | 6/6 | 213 | D | 0.3 | | 154 |
| E | 1.5 | | 225 | D | 0.1 | | 136 |
| E | 1.0 | | 258 | D | 0.05 | | 120 |
| E | 0.9 | | 177 | D | 0.03 | | 115 |
| E | 0.8 | | 152 | | | | |
| E | 0.7 | | 211 | | | | |
| E | 0.6 | | 209 | | | | |
| E | 0.5 | | 245 | | | | |
| E | 0.3 | | 177 | | | | |
| E | 0.1 | | 132 | | | | |
| E | 0.05 | | 115 | | | | |
| E | 0.03 | | 112 | | | | | a Toxic.

TABLE VIII

| Batch | Dose, mg./kg. | Survival rate | Percent of control | Batch | Dose, mg./kg. | Survival rate | Percent of control |
|---|---|---|---|---|---|---|---|
| D | 1.5 | | 161 | F | 2.0 | | 119 |
| D | 1.0 | | 142 | F | 1.5 | | 168 |
| D | 0.9 | | 163 | F | 1.0 | | >369 |
| D | 0.8 | | >246 | F | 0.9 | | >257 |
| D | 0.7 | | 142 | F | 0.8 | | 163 |
| D | 0.5 | | 130 | F | 0.7 | | >212 |
| E | 1.5 | | >262 | F | 0.6 | | 188 |
| E | 1.0 | | >246 | F | 0.5 | | 212 |
| E | 0.9 | | >390 | F | 0.3 | | 196 |
| E | 0.8 | | >204 | F | 0.1 | | 193 |
| E | 0.7 | | 188 | F | 0.05 | | 122 |
| E | 0.5 | | >331 | F | 0.03 | | 124 |

A plot of the percent of control (T/C) values versus dose (mg./kg.) for the test data of Table VII shows a maximum effectiveness (ME) of approximately 280% of control survival time at a dosage range of 0.8 mg./kg./day. The range of maximum activity is 0.5 to 1 mg./kg. A similar plot for the 1–9 day treatment data of Table VIII shows an ME of 280–300% of control at 1 mg./kg./day.

References Cited

Sodawo et al.: Abstract. Papers, 157th Nat. Meeting, Am. Chem. Soc., Minneapolis, April 1969, p. medi-12.

JEROME D. GOLDBERG, Primary Examiner

U.S. Cl. X.R.

195—80

• PO-1050
(5/69)

UNITED STATES PATENT OFFICE
CERTIFICATE OF CORRECTION

Patent No. 3,644,617      Dated February 22, 1972

Inventor(s) Michael Axelrod, William S. Marsh, Koppaka V. Rao and Charles S. Sodano It is certified that error appears in the above-identified patent and that said Letters Patent are hereby corrected as shown below:

Col. 1, as first paragraph of Disclosure, insert

-- The invention described herein was made in the course of, or under, a contract with the Department of Health, Education and Welfare -- .

Signed and sealed this 5th day of September 1972.

(SEAL)
Attest:

EDWARD M. FLETCHER, JR.      ROBERT GOTTSCHALK
Attesting Officer      Commissioner of Patents